United States Patent
Stefan et al.

(10) Patent No.: US 6,594,557 B1
(45) Date of Patent: Jul. 15, 2003

(54) UTILIZING INTELLIGENT SOFTWARE AGENTS IN A MOBILE VEHICLE

(75) Inventors: Jeffrey Michael Stefan, Clawson, MI (US); Dana Brian Fecher, Farmington Hills, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/406,395

(22) Filed: Sep. 27, 1999

(51) Int. Cl.⁷ .............................. G05D 1/00; G06F 17/60
(52) U.S. Cl. ................... 701/1; 701/24; 701/29; 701/33; 701/209; 701/213; 705/7; 705/13
(58) Field of Search ................. 705/13, 7; 701/24, 701/29, 33, 209, 213, 1

(56) References Cited

U.S. PATENT DOCUMENTS

| | | | |
|---|---|---|---|
| 5,485,161 A | * 1/1996 | Vaughn | 342/357.13 |
| 5,504,482 A | 4/1996 | Schreder | |
| 5,610,821 A | 3/1997 | Gazis et al. | |
| 5,732,074 A | 3/1998 | Spaur et al. | |
| 5,745,754 A | 4/1998 | Lagarde et al. | |
| 5,752,246 A | 5/1998 | Rogers et al. | |
| 5,781,703 A | 7/1998 | Desai et al. | |
| 5,781,872 A | * 7/1998 | Konishi et al. | 701/36 |
| 5,862,325 A | 1/1999 | Reed et al. | |
| 5,881,232 A | 3/1999 | Cheng et al. | |
| 5,890,172 A | 3/1999 | Borman et al. | |
| 6,026,375 A | * 2/2000 | Hall et al. | 705/26 |
| 6,076,099 A | * 6/2000 | Chen et al. | 709/202 |
| 6,148,253 A | * 11/2000 | Taguchi et al. | 701/48 |
| 6,181,994 B1 | * 1/2001 | Colson et al. | 701/33 |
| 6,185,484 B1 | * 2/2001 | Rhinehart | 701/1 |
| 6,199,010 B1 | * 3/2001 | Richton | 701/206 |
| 6,202,023 B1 | * 3/2001 | Hancock et al. | 701/201 |
| 6,240,346 B1 | * 5/2001 | Pignato | 701/35 |
| 6,246,688 B1 | * 6/2001 | Angwin et al. | 370/401 |
| 6,263,268 B1 | * 7/2001 | Nathanson | 701/29 |
| 6,278,936 B1 | * 8/2001 | Jones | 701/201 |
| 6,285,932 B1 | * 9/2001 | de Bellefeuille et al. | 701/33 |
| 6,363,254 B1 | * 3/2002 | Jones et al. | 455/456 |
| 6,405,111 B2 | * 6/2002 | Rogers et al. | 701/33 |
| 6,415,207 B1 | * 7/2002 | Jones | 701/1 |

FOREIGN PATENT DOCUMENTS

| | | | |
|---|---|---|---|
| EP | 0332825 A | 9/1989 | |
| JP | 05187882 A | * 7/1993 | G01C/21/00 |

OTHER PUBLICATIONS

Pattie Maes, *Intelligent Software*, Scientific American, 273(3), 1995, pp 84–86.

(List continued on next page.)

*Primary Examiner*—Tariq R. Hafiz
*Assistant Examiner*—Andre Boyce
(74) *Attorney, Agent, or Firm*—Macmillan, Sobanski & Todd, LLC

(57) ABSTRACT

A method for sending and receiving information between a vehicle data processing system and a resource data system via a wireless communication system is provided wherein the vehicle data processing system comprises a vehicle computer for generating an intelligent software agent and operating a data engine for processing information and identifying needed information. Information needed by the data engine is identified which is available from the resource data system. The intelligent software agent is generated within the vehicle computer based on the needed information wherein the intelligent software agent comprises software routines which collect an information packet when propagated to the resource data system. The intelligent software agent is transmitted to the resource data system via the wireless communication system. The software routines are executed within the resource data system to produce the information packet. The information packet is transmitted from the resource data system to the vehicle computer via the wireless communication system.

22 Claims, 2 Drawing Sheets

OTHER PUBLICATIONS

Stuart Russell, et al., *Artificial Intelligence: A Modern Approach*, ©1995 Prentice–Hall Inc., pp 31–52.

Stan Franklin, et al., *Is it an Agent, or Just a Program?: A Taxonomy for Autonomous Agents*, Proceedings of the Third International Workshop on Agents Theories, Architectures, and Languages, Springer–Verlag, 1996.

Pattie Maes, *Agents that Reduce Work and Information Overload*, Communications of ACM, 37 Jul. 1994, pp 31–40.

"Here Comes the Netmobile" by Craig Bicknell—Business News from Wired News at http://www.wired.com/news/news/business/story/21104.html.

Kennedy P: "Mobile Web Changing the Face of Mobile Networking Through Universal Wireless Connectivity", Nov. 4, 1996, pp. 89–94, XP002128907 ISBN: 0–7803–3278–4.

* cited by examiner

UTILIZING INTELLIGENT SOFTWARE AGENTS IN A MOBILE VEHICLE

BACKGROUND OF THE INVENTION

The present invention relates in general to a method and apparatus for sending and receiving information between a vehicle data processing system and a remote network via a wireless communication system.

An average person is spending more time in a motor vehicle. The ability to access remote data networks, such as the Internet, from the vehicle has become an increasing demand as more and more people utilize the Internet in their daily lives. Accessing the Internet from the vehicle has typically been done by using an in vehicle computer to contact an Internet Service Provider (ISP) by way of a cellular phone service. This can be quite expensive if the connection is maintained for a long period of time due to the cellular phone operating costs. Also, the person must navigate the Internet to find what they are looking for. This can be time consuming and inconvenient while in a vehicle.

As Internet commerce continues to grow, the demand for a convenient and cost effective means for accessing the Internet from a vehicle will escalate. Current technology and current cost restraints hinder most people from accessing the Internet while in the vehicle.

SUMMARY OF THE INVENTION

The present invention has the advantage of providing an easy to use and cost effective way of accessing the Internet from a vehicle.

In one aspect of the invention, a method is provided for sending and receiving information between a vehicle data processing system and a resource data system via a wireless communication system. The vehicle data processing system is comprised of a vehicle computer for generating an intelligent agent and operating a data engine for processing information and identifying needed information.

The method begins by identifying information needed by the data engine which is available from the resource data system. An intelligent software agent is generated within the vehicle computer based on the identified information wherein the intelligent software agent comprises software routines which collect an information packet when propagated to the resource data system. The intelligent software agent is transmitted to the resource data system via the wireless communication system. The software routines are then executed within the resource data system to produce the information packet. The information packet is transmitted from the resource data system to the vehicle computer via the wireless communication system, and the needed information is extracted from the information packet for use by the data engine.

DETAILED DESCRIPTION OF PREFERRED EMBODIMENTS

Figure 1:
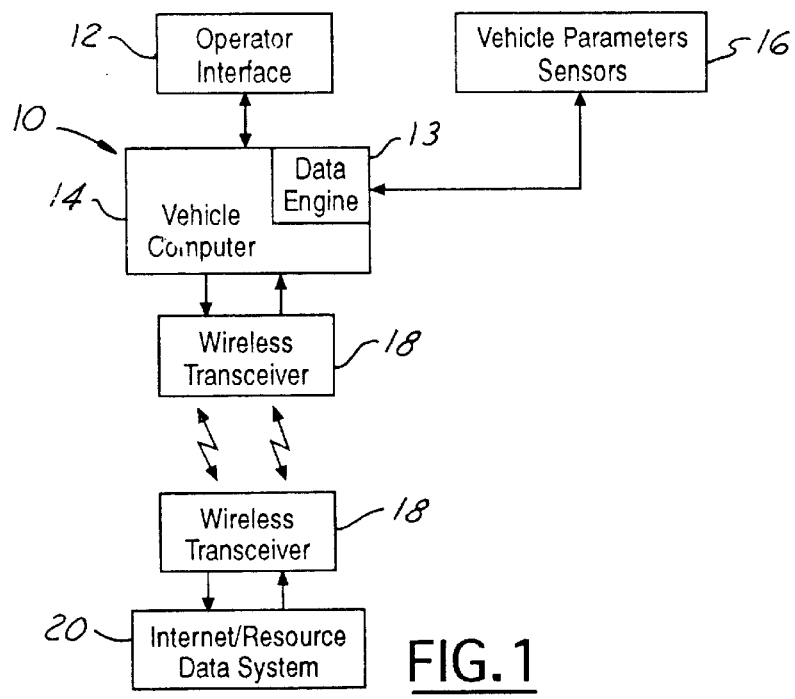
FIG. 1 is a block diagram of main elements of the invention.

Referring to FIG. 1, a method of transmitting and receiving data between a vehicle data processing system 10 and a resource data system 20 via a wireless communication system is shown. The vehicle data processing system is comprised of a vehicle computer 14 which is capable of generating an intelligent software agent. Vehicle computer 14 must also be able to process commands generated from an operator interface 12 or via the intelligent software agent itself. In a preferred embodiment, vehicle computer 14 is part of a multimedia system which controls a radio, CD player, and a navigation system. Vehicle computer 14 can be of any type suitable for automotive applications.

Vehicle data processing system 10 also includes a data engine 13. Data engine 13 is responsible for processing information, identifying needed information, and may be comprised of application software, for example. In the preferred embodiment, data engine 13 collects information from an operator interface 12 or from vehicle parameter sensors 16. Operator interface 12 comprises a touchpad keyboard or equivalent data input device which allows an operator to input instructions or information requirements into vehicle computer 14 and a screen for displaying information from vehicle computer 14. The needed information comprises information required in the operation of vehicle computer 14 as a result of predetermined inputs to data engine 13 such as commands or requests from operator interface 12 or certain states of vehicle parameter sensors 16. The predetermined inputs can be multiple requests or commands or a series of status signals which give details as to the status of the vehicle parameter sensors 16. These vehicle parameter sensors 16 can comprise tire pressure, fuel level, engine oil level, engine oil age, windshield wiper fluid level, and any other vehicle parameter that may be monitored by and acted upon by data engine 13 and which may need to be brought to the operator's attention. Data engine 13 may be contained within vehicle computer 14 or can alternatively be a separate device.

Vehicle computer 14 generates the intelligent software agent based upon information required by data engine 13. An intelligent software agent is a type of self-contained software program or routine that moves within the Internet (an electronic communications network that connects computer networks and organizational computer facilities around the world which acts as a resource data system), or other network, and performs a specific function on behalf of a user. Software agents in general are well known in the art. For purposes of the present invention, they can be used for collecting various information, for example searching for the nearest gas station, searching for restaurants, negotiating a best price at a retail store, comparison shopping between retailers, processing orders etc. The intelligent agent is capable of collecting the information without the vehicle being continuously connected to network 20 and is capable of acting autonomously after being released from vehicle computer 14. The intelligent software agent may create a virtual shopping cart, placing items or other information into the cart to be delivered back to the user. The contents within the virtual shopping cart make up an information packet, which comprises the results of the request from vehicle computer 14. The information packet is transmitted to vehicle computer 14 to be processed by data engine 13 and possibly displayed to the user. The agent can also be on a time delay so that it only executes at a predetermined time. For example, a user may wish to search each day for a cheapest fuel price at nearby gas stations. The intelligent agent can be preset to be automatically released everyday at a predetermined time without further operator intervention.

The agent may have a predetermined lifetime and may be capable of operating for days at a time before reporting back to vehicle computer 14. This is useful when the agent must collect data over a long period of time before it completes a task. In some cases, an intelligent software agent may be generated for which a very large amount of data will be found on the network which is responsive to the request. The maximum time limit will limit the amount of searching or collecting the agent can do. This will ensure the agent will not collect more information then vehicle computer 14 can handle.

In one preferred embodiment, vehicle computer 14 utilizes navigational data collected from the navigation system to create the intelligent software agent. The navigation data provides a location of the vehicle which is incorporated into the intelligent agent to better refine its search. The user requests a location of the closest gas station, for example. Data engine 13 receives the request and transmits it to vehicle computer 14 where it generates an intelligent agent based on the request and navigational data. The intelligent agent uses the navigational data to decide which gas stations are sufficiently close to the vehicle when it is searching in resource data system 20.

Vehicle parameters are utilized by data engine 13 and vehicle computer 14 to identify needed information as follows. When data engine 13 receives a signal from vehicle parameter sensor 16 providing a fuel level signal, the fuel level signal is compared to a predetermined threshold fuel level. The predetermined threshold fuel level is stored in vehicle computer 14 and represents a remaining fuel quantity which would lead one to want to replenish the fuel supply. If the fuel level signal received is below the predetermined threshold fuel level, then vehicle computer 14 generates an intelligent agent to search out a location of nearby fuel stations and transmits the agent to resource data system 20. When the intelligent agent has completed its task, the user is notified through the operator interface that the threshold fuel level was received and the location of the nearby gas stations. Tire pressure, engine oil level, engine oil age and windshield wiper fluid level would all require the intelligent agent to search out a service station so that proper repairs, like an oil change or fluid additions, could be made, for example.

A user can also request information or services directly through operator interface 12. Data engine 13 receives a command or request from operator interface 12 and transmits the command or request to vehicle computer 14. Vehicle computer 14 then generates an intelligent agent based on the command or request and transmits it to the resource data system. After the intelligent agent completes its task and generates an information packet, the information packet is transmitted to the user via operator interface 12.

An important aspect of the intelligent software agent is that it acts autonomously from vehicle computer 14 once transmitted to resource data system or network 20. The intelligent software agent completes its tasks without further guidance from vehicle computer 14 and can automatically reestablish contact with vehicle computer 14 when necessary (by interacting with an ISP to contact the vehicle computer). Alternatively, vehicle computer 14 could reestablish contact after a sufficient time has passed to allow the intelligent software agent to complete its task.

A wireless communication system transmits data back and forth between vehicle computer 14 and Internet 20. The preferred embodiment utilizes a mobile phone service, but any suitable wireless communication system will suffice. Wireless transceivers 18 are coupled to vehicle computer 14 and an ISP provider. The ISP provider is used in the preferred embodiment to make the connection to the Internet.

Figure 2:
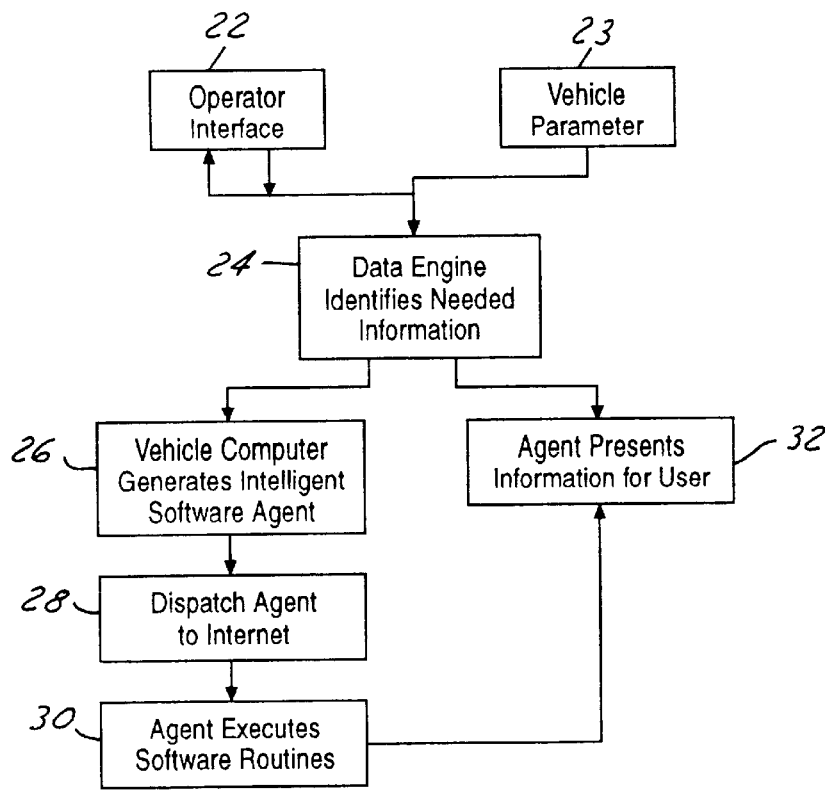
FIG. 2 is a process diagram describing the operation of the invention.

A method of sending and receiving information between a vehicle data processing system and a resource data system via a wireless communication system will be described in connection with FIG. 2. The data engine identifies needed information in response to operator interface 22 or vehicle parameters 23 in block 24. The information is sent to the vehicle computer wherein the vehicle computer generates an intelligent software agent in block 26 based upon the information needed. After the intelligent agent is generated, it is transmitted via the wireless communication system to the resource data system, or the Internet in block 28. The intelligent agent then executes the software routines within the resource data system in block 30 to produce an information packet. After the execution of the software routines are complete, the intelligent agent transmits the information packet to the vehicle computer in block 32 wherein the data engine extracts the needed information, processes the information, and displays it to the operator.

Figure 3:
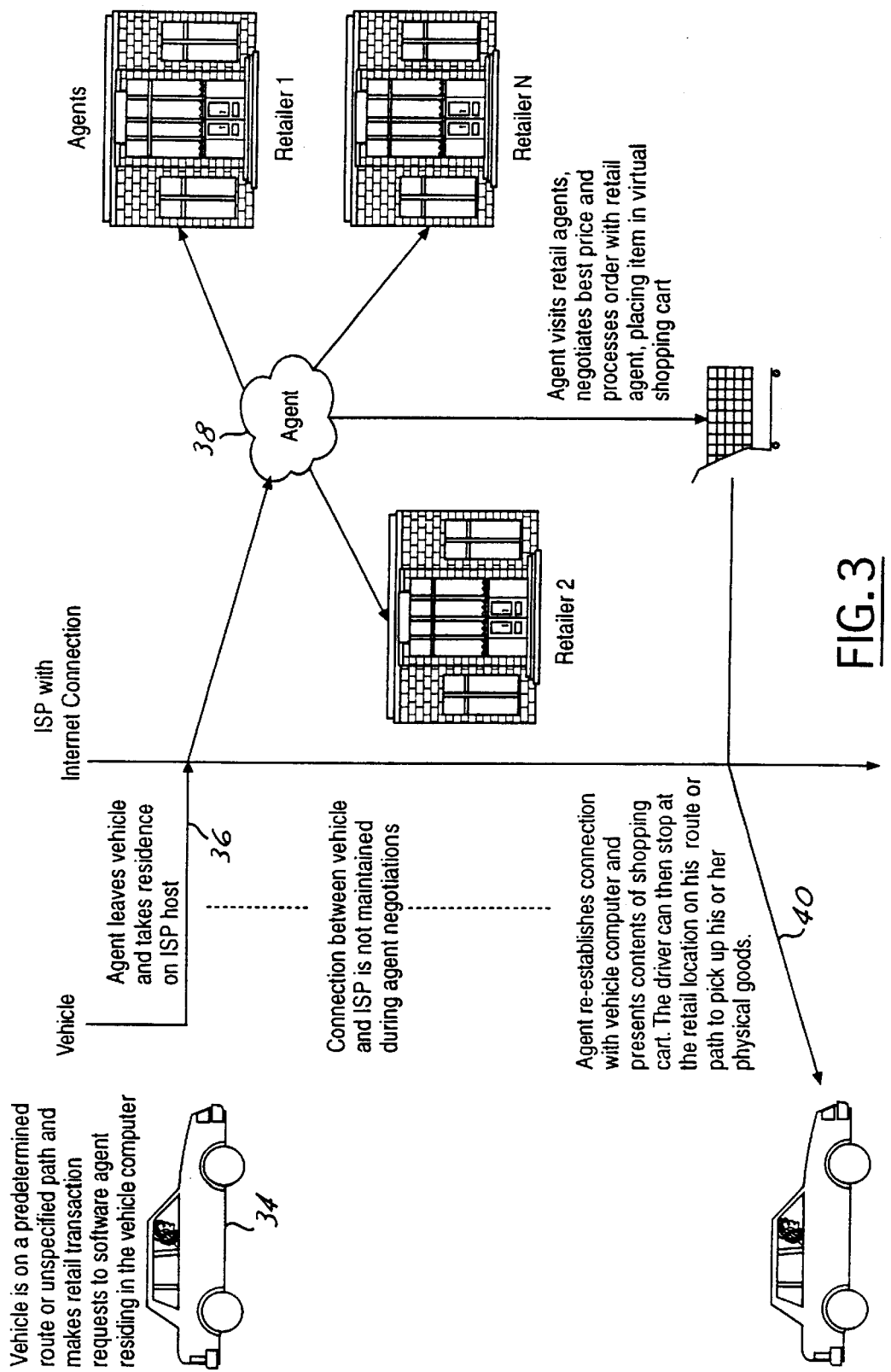
FIG. 3 shows a pictorial representation of one preferred embodiment of the invention.

FIG. 3 shows one preferred embodiment of the invention. As a vehicle is traveling, an operator of the vehicle makes a retail transaction request through an operator interface shown at 34. A vehicle computer generates an intelligent agent based on the retail transaction request and transmits the intelligent agent via a wireless communication system to an ISP to make a connection to a resource data system shown at 36. The connection between the vehicle and the ISP is terminated after the ISP receives the intelligent agent. The intelligent agent executes software routines within the resource data system creating an information packet shown at 38. In this embodiment, the intelligent agent visits retail establishments and negotiates best prices and processes orders. When the intelligent agent has completed its task, it reestablishes the connection to the vehicle computer and transmits the information packet to the vehicle computer shown at 40.

What is claimed is:

1. A method for sending and receiving information between a vehicle data processing system and a resource data system via a wireless communication system, said vehicle data processing system comprising a vehicle computer for generating an autonomous intelligent software agent and operating a data engine for processing information and identifying needed information, said method comprising the steps of:

identifying information needed by said data engine which is available from said resource data system;

generating said autonomous intelligent software agent within said vehicle data processing system based on said identified information wherein said autonomous intelligent software agent comprises software routines which collect an information packet when propagated to said resource data system;

transmitting said autonomous intelligent software agent to said resource data system via said wireless communication system;

executing said software routines within said resource data system to produce said information packet by autonomously searching for said needed information;

said autonomous intelligent software agent initiating transmission of said information packet from said resource data system to said vehicle computer via said wireless communication system; and extracting said needed information from said information packet for use by said data engine.

2. The method according to claim 1 wherein said vehicle computer comprises a navigational system wherein the navigational system provides a location of said vehicle which is incorporated into said autonomous intelligent software agent.

3. The method according to claim 1 wherein said wireless communication system is comprised of a mobile phone service.

4. The method according to claim 1 wherein said resource data system is comprised of the Internet.

5. The method according to claim 1 wherein said data engine identifies said needed information in response to an operator interface and wherein said vehicle computer incorporates a corresponding software routine into said autonomous intelligent software agent in response to said needed information identified in response to said operator interface.

6. The method according to claim 1 wherein said data engine monitors a current value of a predetermined vehicle parameter to identify said needed information and wherein said vehicle computer incorporates a corresponding software routine into said autonomous intelligent software agent in response to said current value of said predetermined vehicle parameter.

7. The method according to claim 6 wherein said predetermined vehicle parameter is comprised of fuel level and wherein said needed information includes a location of a fuel filling station if said current value of said fuel level is less than a predetermined fuel level.

8. The method according to claim 6 wherein said predetermined vehicle parameter is comprised of tire pressure and wherein said needed information includes a location of a service station if said current value of said tire pressure is less than a predetermined tire pressure.

9. The method according to claim 6 wherein said predetermined vehicle parameter is comprised of engine oil level and wherein said needed information includes a location of a service station if said current value of said engine oil level is less than a predetermined oil level.

10. The method according to claim 6 wherein said predetermined vehicle parameter is comprised of engine oil age and wherein said needed information includes a location of a service station if said current value of said engine oil age is more then a predetermined oil age.

11. The method according to claim 6 wherein said predetermined vehicle parameter is comprised of windshield wiper fluid level and wherein said needed information includes a location of a service station if said current value of said windshield wiper fluid level is less than a predetermined windshield wiper fluid level.

12. The method according to claim 1 Wherein said autonomous intelligent software agent automatically creates a connection between said vehicle computer and said resource data system when said autonomous intelligent software agent is ready to be propagated to said resource data system when said information packet is compiled.

13. An apparatus for sending and receiving information from a vehicle comprising;
   a wireless communication system capable of sending and receiving data; and
   a vehicle computer for processing commands and generating autonomous intelligent software agents, said vehicle computer including a data engine for processing information and identifying needed information which is available from a resource data system wherein said vehicle computer generates an appropriate said autonomous intelligent software agent in response to said needed information;
   wherein said appropriate autonomous intelligent software agent is propagated to said resource data system via said communication system;
   wherein said resource data system allows said appropriate autonomous intelligent software agent to execute software routines to collect information packets by autonomously searching for said needed information; and
   wherein said autonomous intelligent software agent initiates transmission of said collected information packets from within said resource data system to said vehicle computer via said wireless communication system.

14. The apparatus according to claim 13 wherein said wireless communication system is comprised of a mobile phone service.

15. The apparatus according to claim 13 wherein said resource data system is comprised of the Internet.

16. The apparatus according to claim 13 wherein said data engine identifies said needed information in response to an operator interface and wherein said vehicle computer incorporates a corresponding software routine into said autonomous intelligent software agent in response to said needed information identified in response to said operator interface.

17. The apparatus according to claim 13 wherein said data engine monitors a current value of a predetermined vehicle parameter and wherein said data engine determines said needed information in response to said current value of said predetermined vehicle parameter.

18. The apparatus according to claim 17 wherein said predetermined vehicle parameter is comprised of fuel level and wherein said needed information includes a location of a fuel filling station if said current value of said fuel level is less than a predetermined fuel level.

19. The apparatus according to claim 17 wherein said predetermined vehicle parameter is comprised of tire pressure and wherein said needed information includes a location of a service station if said current value of said tire pressure is less than a predetermined tire pressure.

20. The method according to claim 17 wherein said predetermined vehicle parameter is comprised of engine oil level wherein said needed information includes a location of a service station if said current value of said engine oil level is less than a predetermined oil level.

21. The method according to claim 17 wherein said predetermined vehicle parameter is comprised of engine oil age and wherein said needed information includes a location of a service station if said current value of said engine oil age is more then a predetermined oil age.

22. The method according to claim 17 wherein said predetermined vehicle parameter is comprised of windshield wiper fluid level and wherein said needed information includes a location of a service station if said current value of said windshield wiper fluid level is less than a predetermined windshield wiper fluid level.

* * * * *